Feb. 26, 1952 F. EULL 2,587,128
REMOVABLE SEAT COVER
Filed Oct. 12, 1948
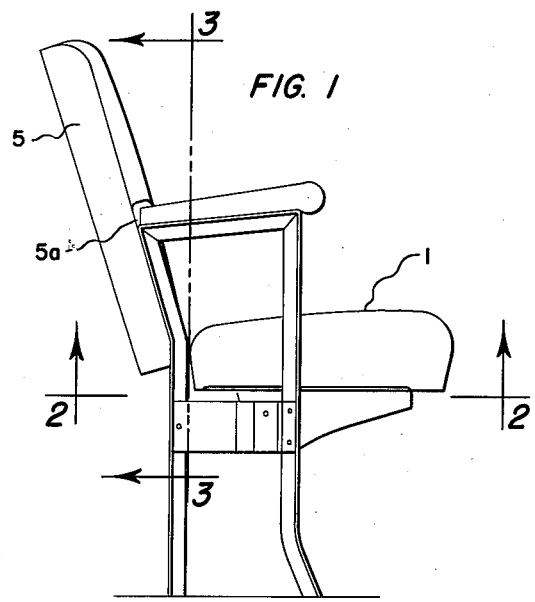
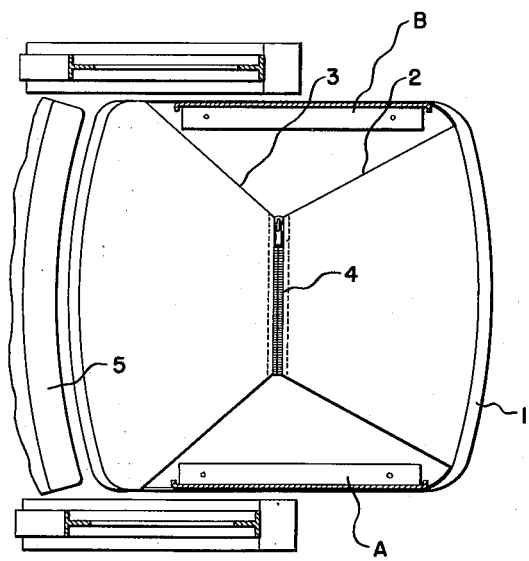
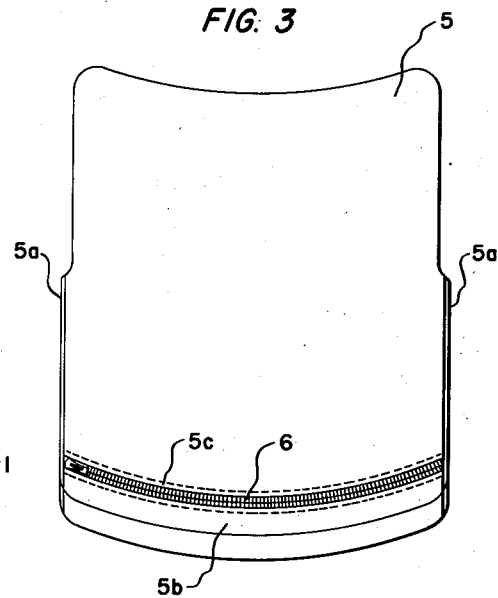
INVENTOR.
FRED EULL
BY
*Wm. H. Dean*
AGENT Patented Feb. 26, 1952

2,587,128

UNITED STATES PATENT OFFICE 2,587,128

REMOVABLE SEAT COVER

Fred Eull, San Diego, Calif.

Application October 12, 1948, Serial No. 54,123

2 Claims. (Cl. 155—182)

My invention relates to a removable seat cover, more particularly for use in connection with theatre seats or other public seats requiring replaceable covers and the objects of my invention are:

First, to provide a cover of this class which is very readily and easily removed and replaced, greatly facilitating the maintenance of large numbers of seats such as theatre seats or the like.

Second, to provide a seat cover of this class which is particularly adapted for use in connection with pivoted seat cushions.

Third, to provide a seat cover of this class which requires a minimum amount of time to remove and replace the same.

Fourth, to provide a seat cover of this class employing a single fastener for holding the entire cover to the seat.

Fifth, to provide a seat cover of this class which is held tight at all times over the seat cushion and in proper position.

Sixth, to provide a seat cushion cover of this class which is provided with a centrally located elongated interlocking mechanism at the bottom portion of the seat connecting flaps converging to said zipper around seat trunnion frames secured to the bottom of the seat whereby the cushion cover is very neatly secured to the seat without interference of the trunnion frames of the seat cushion, and Seventh, to provide a seat cover of this class which is very simple and economical of construction, efficient in operation and which will not readily deteriorate or get out of order.

With these and other objects in view as will appear hereinafter, my invention consists of certain novel features of construction, combination and arrangement of parts and portions as will be hereinafter described in detail and particularly set forth in the appended claims; reference being had to the accompanying drawings and to the characters of reference thereon, forming a part of this application in which: Figure 1 is a side elevational view of a theatre seat showing my seat cover in connection therewith. Figure 2 is a sectional view taken from the line 2—2 of Figure 1, showing the bottom of my seat cover in connection with the seat cushion of a theatre seat, and Figure 3 is a front elevational view of the back of a theatre seat, taken from the line 3—3 of Figure 1, showing my seat cover in connection with said seat back.

Similar characters of reference refer to similar parts and portions throughout the several views of the drawings.

The seat cushion cover 1, flaps 2 and 3, elongated interlocking mechanism 4, seat back cover 5, and the zipper 6 constitute the principal parts and portions of my seat cover.

The seat cushion cover 1 is substantially box shaped having enclosed corners and connected to the lower edges thereof in opposed relationship with each other are the flaps 2 and 3 interconnected by the elongated interlocking mechanism 4. It will be noted that the cover 1 and flaps 2 and 3 are preferably made of fabric or other similar flexible material which is suitable. It will be noted that the flaps 2 and 3 converge from the front and rear edges of the cover 1 to the zipper 4 and substantially by-pass the seat trunnion frames A and B, completely avoiding interference with the operating mechanism for tilting the seat. This tilting mechanism is common to various public seats such as theatre seats or the like. It is to be noted that the flaps 2 and 3 are substantially coextensive with the front and rear edges respectively of the cover 1 and maintain the cover 1 in tight, smooth condition over the surface of the seat cushion.

The seat back cover 5 is an envelope type cover having open side slots 5a adapted to accommodate the chair arms corrected to the seat back and the lower rear edge 5b of this seat back cover 5 is curved around the lower end of the seat back and extended upwardly in the front thereof and is connected to the zipper 6 which is secured to the lower edge 5c at the front of the seat back cover 5. The seat back cover 5 is thus completely and securely connected to the conventional theatre seat back by means of the zipper 6 which is in convenient position for maintenance service and facility in removing and replacing said seat back cover 5.

The operation of my seat cushion cover and seat back cover is substantially as follows: These covers 1 and 5, as hereinbefore described may be of any color desired and may be placed upon the seat cushion and seat back by connecting the elongated interlocking mechanism 4 and 6 as hereinbefore described, whereby soiled seat covers or those which are worn may be readily replaced without alteration of the structure of the theatre cushion or seat back. The flaps 2 and 3 having converging edges extending toward the elongated interlocking mechanism 4 innately distribute support throughout the front and rear edges of the seat cushion cover 1 for maintaining the same in smooth, tight condition over the seat cushion.

Though I have shown and described a particular construction, combination and arrangement of parts and portions, I do not wish to be limited

Having thus described my invention, what I claim as new and desire to secure by Letters Patent is:

1. In a seat cushion cover, a flexible box shaped cover member having enclosed corners, a pair of flaps of similar flexible material secured at opposed edges at the normally open side of said box shaped flexible cover and means for connecting said flaps at their opposite ends substantially at the middle of said box shaped cover member, said flaps converging from the edges of said cover member to the connection of each with the other, said flaps connected by a continuous laterally extending elongated interlocking mechanism.

2. In a seat cushion cover, a flexible box shaped cover member having enclosed corners, a pair of flaps of similar flexible material secured at opposed edges at the normally open side of said box shaped flexible cover and means for connecting said flaps at their opposite ends substantially at the middle of said box shaped cover member, said flaps converging from the edges of said cover member to the connection of each with the other, said flaps connected by an elongated interlocking mechanism, said flaps adapted to by-pass the conventional trunnion brackets of a theatre seat.

FRED EULL.

REFERENCES CITED

The following references are of record in the file of this patent:

UNITED STATES PATENTS

| Number | Name | Date |
| --- | --- | --- |
| 1,701,401 | Coppock | Feb. 5, 1929 |
| 1,836,302 | Bloomfield | Dec. 15, 1931 |
| 2,218,951 | Flaherty | Oct. 22, 1940 |
| 2,326,937 | Frei | Aug. 17, 1943 |